United States Patent Office 3,072,728
Patented Jan. 8, 1963

3,072,728
METHOD OF PREPARING HALOGENATED DIPHENYL COMPOUNDS
Milton Kosmin, Creve Coeur, and Richard L. Wasson, Crestwood, Mo., assignors to Monsanto Chemical Company, St. Louis, Mo., a corporation of Delaware
No Drawing. Filed Mar. 24, 1960, Ser. No. 17,241
7 Claims. (Cl. 260—612)

This invention relates to halogenated diphenyl compounds. More specifically, it is concerned with a novel method for the preparation of individual, preselected halogenated diphenyls or diphenyl ethers.

Halogenated diphenyl compounds, and particularly those which are chlorinated, are known in the art as valuable dielectric materials. Such compounds have a combination of desirable properties which include high dielectric constant and high dielectric strength. These compounds are also known to exhibit low volatility and non-inflammability. By virtue of these properties such compounds may be employed to impregnate capacitors and transformers, to impregnate cotton or asbestos wire insulation and for other similar applications.

According to the prior art, halogenated diphenyl compounds have been prepared in several ways. By one known method diphenyl ether may be directly halogenated by bubbling the gaseous halogen therethrough. Another method contemplates the preparation of the desired ethers by reacting halogenated benzene with a salt of chlorophenol. Such methods are subject to several undesirable features. Among these are the need for a chlorine carrier, usually a metal halide, which serves as a catalyst. Another such feature is the need for an inert solvent such as carbon tetrachloride. More basically, these methods have the disadvantage of producing mixtures of the halogenated diphenyl compounds which mixtures are extremely difficult to separate. Further, it should be pointed out that these known methods make no provision for the preparation of any particular isomeric one of said compounds.

In order to overcome this latter failure, the art also teaches a multistep process for preparing a specifically halogenated diphenyl ether. This process calls for the reaction of o-chlorophenol, 1-chloro-2-nitrobenzene and potassium hydroxide to form 2-chlorophenyl 2-nitrophenyl ether. This product is then reduced to 2-chlorophenyl 2-aminophenyl ether. The latter ether must be diazotized, after which the diazonium salt is finally converted to the desired bis(2-chlorophenyl) ether.

It is a primary object of this invention to provide a new method for the preparation of specific halogenated diphenyl compounds.

More particularly, it is an object of this invention to provide a simple, one step process for the preparation of such compounds.

It is a further object of the invention to provide such a process wherein the need for either catalysts or solvents has been wholly eliminated.

Other and different objects, advantages and features of this invention will become apparent to those skilled in the art upon consideration of the following detailed description thereof and the examples attendant thereto.

It has been found that the halogenated diphenyl compounds of the general formula (A) 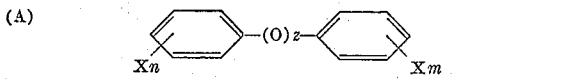

where X is a halogen atom selected from chlorine and bromine, z is 0 or 1, n is 1 or 2, and m is an integer from 0 to 4, may be prepared by heating, in the presence of a molecular halogen, a compound of the general formula (B) 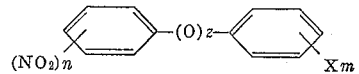

where X, z, m and n have the same meaning as above. The reaction is carried out at a temperature ranging from about 180° C. up to 250° C. and above. Reaction time will naturally vary dependent upon particular reactants. In most instances, a period of from 1 to about 4 hours is preferred. The amount of molecular halogen employed should equal at least one mole for each halogen atom to be added.

The invention will be more fully understood by reference to the following examples which describe the detailed preparation of representative compounds. Such examples, however, are given for the purpose of illustration only, and are not to be construed as limiting the scope of this invention in any way.

EXAMPLE I

*Bis(2-Chlorophenyl) Ether*

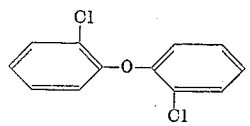

A 300 ml. round bottom flask is charged with 244 grams (.98 mole) of 2-chlorophenyl 2-nitrophenyl ether and heated to about 220° C. Chlorine gas is introduced below the surface of the liquid ether and is bubbled therethrough for about 3 hours. The duration of chlorine treatment may be determined by the disappearance of the brown off gas fumes which are generated during the reaction. The red solution which is formed in the flask is swept with air and cooled to about 100° C. The solution is then washed with 100 ml. of 3% lye solution. The organic layer remaining after this wash is then washed twice with 100 ml. of 20% lye solution. The last washing is followed by fractional distillation over a small amount of lime. A yield of 173.5 grams (76% of theory) of bis(2-chlorophenyl) ether is obtained.

EXAMPLE II

*2-Bromophenyl 2-Chlorophenyl Ether*

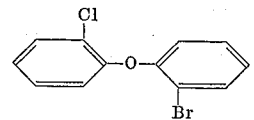

A suitable reactor is charged with 38.3 grams (.153 mole) of 2-chlorophenyl 2-nitrophenyl ether and heated to a temperature of about 200° C. The ether is then treated with a stream of nitrogen which has been slowly passed through 9.5 ml. of bromine. This treatment is continued for about 2 hours during which all of the bromine is vaporized into the reaction mass, and a light colored solution is formed. This solution is cooled and dissolved in 75 ml. of ethyl ether, after which it is washed three times with 50 ml. portions of 2% lye solution. It is then washed twice with 50 ml. portions of water and dried over magnesium sulfate. The ethyl ether is evaporated, and the residue is distilled to yield 8.1 grams of 2-bromophenyl 2-chlorophenyl ether. Infrared analysis of the distillation residue indicates the presence of unreacted starting material. Based upon the starting material consumed, the yield obtained is 78% of theory.

EXAMPLE III

*2-Chlorophenyl Phenyl Ether*

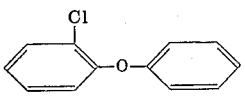

A suitable reactor is charged with 39.1 grams (.18 mole) of 2-nitrophenyl phenyl ether and heated to a temperature of about 230° C. After treatment with chlorine for about 1 hour, a red solution forms. This solution is swept with air, cooled, and dissolved in ethyl ether, after which it is washed several times with 50 ml. portions of 5% lye solution. It is then washed with a 50 ml. portion of 5% hydrochloric acid and dried over magnesium sulfate. The ethyl ether is evaporated, and the residue is distilled. A yield of 23.0 grams of 2-chlorophenyl phenyl ether is obtained.

EXAMPLE IV

*2-Chlorodiphenyl*

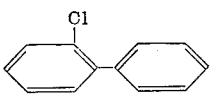

A suitable reactor is charged with 47.2 grams (0.238 mole) of o-nitrodiphenyl and heated to about 220° C. Chlorine is introduced below the surface of the diphenyl and is bubbled therethrough for about 1½ hours. A red solution forms and is dissolved in 100 ml. of ethyl ether. The resulting solution is extracted four times with 50 ml. portions of 5% lye solution. It is then dried over magnesium sulfate, and the ethyl ether is evaporated. Distillation of the residue yields 34.6 grams (80% of theory) of 2-chlorodiphenyl.

The four preceding examples indicate the nature of the replacement reaction by which the selected halogenated compounds may be obtained. At this point it should be noted that all of the trihalogenated compounds, and certain of the dihalogenated and tetrahalogenated compounds, may be obtained with either of two different starting materials. For instance, if it is desired to prepare 2,4-dichlorophenyl 3,4-dichlorophenyl ether, the ether charged to the reactor may be either of 2,4-dichlorophenyl 3,4-dinitrophenyl ether or 3,4-dichlorophenyl 2,4-dinitrophenyl ether. In each case both nitro groups are replaced to produce the same preselected product. The case of a trihalogenated ether appears in the following examples.

EXAMPLE V

*2-Chlorophenyl 2,4-Dichlorophenyl Ether*

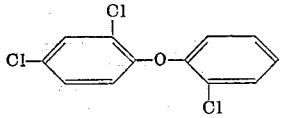

A suitable reactor is charged with 40.0 grams (.14 mole) of 2,4-dichlorophenyl 2-nitrophenyl ether and heated to a temperature of about 220° C. Chlorine is bubbled through the ether for a little over 1 hour until the brown nitrogen oxide fumes disappear. The red solution which forms is swept with air and cooled to room temperature. Said solution is washed with 5% lye solution and then with water. Fractional distillation of the organic layer yields 31.5 grams (83% of theory) of 2-chlorophenyl 2,4-dichlorophenyl ether.

EXAMPLE VI

*2-Chlorophenyl 2,4-Dichlorophenyl Ether*

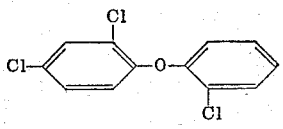

A suitable reactor is charged with 40.0 grams (.136 mole) of 2-chlorophenyl 2,4-dinitrophenyl ether and heated to about 225° C. Chlorine is bubbled through the ether for about 3 hours, and the reaction mixture is then worked up in the manner described in Example V. There is obtained 23.9 grams (65% of theory) of 2-chlorophenyl 2,4-dichlorophenyl ether.

EXAMPLE VII

*2-Chlorophenyl 4-Chlorophenyl Ether*

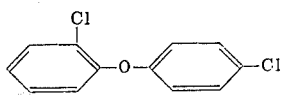

A suitable reactor is charged with 34.6 grams (.14 mole) of 2-chlorophenyl 4-nitrophenyl ether and heated to a temperature of about 220°–230° C. After treatment with chlorine for about 1½ hours, the reaction mixture is worked up in the manner described in Example V. A yield of 25.5 grams (77% of theory) of 2-chlorophenyl 4-chlorophenyl ether is obtained.

It should be apparent that the same product is produced when 4-chlorophenyl 2-nitrophenyl ether is employed as the starting material in Example VII.

From these exemplary preparations, it will be seen that this invention provides a simple and inexpensive method for making specifically halogenated diphenyl compounds. The reaction which takes place (replacement of one or more nitro groups by halogen atoms) is unexpected in view of the relative lability of the phenyl groups. Starting with an unsubstituted diphenyl compound, it will be seen that either side of the structure can be considered as a highly labile phenyl or phenoxy group. Since it is known that the substitution of a halogen deactivates a structure to a much lesser extent than the substitution of a nitro group, it would be expected that treatment with molecular halogen would further substitute the more labile halophenyl ring. However, contrary to such expectations, it has been found that selective replacement of the nitro group occurs. Thus, with a properly selected starting material, any of the compounds within Formula A may be readily prepared.

It should be pointed out that a slightly different situation obtains when the halogenated ring on the starting material contains bromine, and it is desired to replace the nitro group with chlorine. It is well known that, particularly at the elevated temperatures employed here, a bromine substituent may be replaced by chlorine. Such a replacement occurs here, along with replacement of the nitro group, as seen in the following example.

EXAMPLE VIII

*Bis(2-Chlorophenyl) Ether*

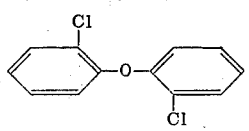

A suitable reactor is charged with 44.0 grams (.135 mole) of 2-bromophenyl 2-nitrophenyl ether and heated to about 220° C. Chlorine is bubbed through the ether below the surface level thereof for about 2½ hours, and a red solution is formed. This solution is cooled to about 100° C. and diluted with 100 ml. of ethyl ether. The diluted solution is washed with a 50 ml. portion of water, four 50 ml. portions of 5% lye solution, again with water, and finally with 25 ml. of 3% hydrochloric acid. The solution is then dried over magnesium sulfate, and the ethyl ether is evaporated. Fractional distillation of the residue yields 27.8 grams of bis(2-chlorophenyl) ether.

While this invention has been described with regard to certain specific embodiments, it is not to be construed as so limited. It should be understood that variations and modifications obvious to those skilled in the art may be made without departing from the spirit and scope of the invention.

The embodiments of the invention in which an exclusive property or privilege is claimed are defined as follows:

1. A method of preparing halogenated diphenyl compounds of the formula

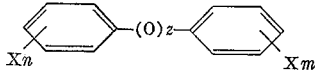

where X is a halogen selected from chlorine and bromine, z is selected from 0 and 1, n is an integer from 1 to 2, and m is an integer from 0 to 4, which comprises reacting a compound of the formula

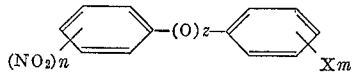

where X, z, n and m have the same meaning as above with a molecular halogen selected from chlorine and bromine, the reaction being carried out at a temperature of from about 180° to 250° C.

2. A method of preparing bis(2-chlorophenyl) ether which comprises reacting a compound of the structure

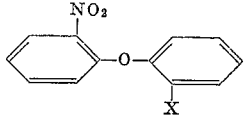

where X is a halogen selected from chlorine and bromine, with molecular chlorine, the reaction being carried out at a temperature of from about 180° to 250° C.

3. A method of preparing 2-bromophenyl 2-chlorophenyl ether which comprises reacting 2-chlorophenyl 2-nitrophenyl ether with molecular bromine, the reaction being carried out at a temperature of from about 180° to 250° C.

4. A method of preparing 2-chlorophenyl 2,4-dichlorophenyl ether which comprises reacting a compound of the formula

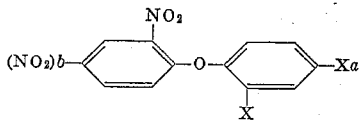

where X is a halogen selected from chlorine and bromine, and a and b are unlike integers selected from 0 and 1, with molecular chlorine, the reaction being carried out at a temperature of from about 180° to 250° C.

5. A method of preparing 2-chlorophenyl 4-chlorophenyl ether which comprises reacting a compound of the formula

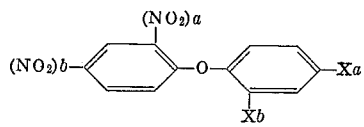

where X is a halogen selected from chlorine and bromine, and a and b are unlike integers selected from 0 and 1, with molecular chlorine, the reaction being carried out at a temperature of from about 180° to 250° C.

6. A method of preparing 2-chlorophenyl phenyl ether which comprises reacting 2-nitrophenyl phenyl ether with molecular chlorine, the reaction being carried out at a temperature of from about 180° to 250° C.

7. A method of preparing 2-chlorodiphenyl which comprises reacting 2-nitrodiphenyl with molecular chlorine, the reaction being carried out at a temperature of from about 180° to 250° C.

References Cited in the file of this patent

Guglialmelli et al.: Chem. Abs., vol. 26 (1932), p. 5559. (Copy in Library.)